United States Patent [19]

Nye

[11] Patent Number: 5,020,691
[45] Date of Patent: Jun. 4, 1991

[54] CONTAINER SHELL AND METHOD OF PRODUCING SAME

[76] Inventor: Norman H. Nye, 1348 Highbridge Rd., Cuyahoga Falls, Ohio 44223

[21] Appl. No.: 283,220

[22] Filed: Dec. 12, 1988

[51] Int. Cl.⁵ .............................................. B65D 35/28
[52] U.S. Cl. ....................................... 222/95; 222/105; 222/386.5; 264/534
[58] Field of Search ............................. 222/92, 94-96, 222/105, 131, 214, 212, 386.5, 389; 264/521, 531, 534, 295-296; 425/384, 525

[56] References Cited

U.S. PATENT DOCUMENTS

| 3,791,557 | 2/1974 | Venus, Jr. | 222/105 |
| 3,796,356 | 3/1974 | Venus, Jr. | 222/212 |
| 3,876,115 | 4/1975 | Venus, Jr. et al. | 222/183 |
| 3,949,034 | 4/1976 | Uhlig | 264/534 X |
| 4,387,833 | 6/1983 | Venus, Jr. | 222/95 |
| 4,769,206 | 9/1988 | Reymann et al. | 264/534 |

FOREIGN PATENT DOCUMENTS 980743  12/1975  Canada ................................ 222/95

Primary Examiner—Michael S. Huppert
Attorney, Agent, or Firm—Oldham & Oldham Co.

[57] ABSTRACT

An outer shell for gasless type of self pressurized container and a method of manufacturing it, that is particularly designed for use with the type of self pressurized containers in which the pressure for the discharge of an agent is obtained by using an elastic sleeve that surrounds a plastic liner.

7 Claims, 2 Drawing Sheets 5,020,691

CONTAINER SHELL AND METHOD OF PRODUCING SAME

BACKGROUND AND SUMMARY OF THE INVENTION

This invention relates to self pressurized containers that are used for dispensing liquids or viscous materials. A container of this general type is described in a U.S. Pat. No. 4,387,833 issued to Frank Vanus, Jr. and it consists of an inner plastic liner to which is attached a dispensing valve. An elastic sleeve surrounds the inner plastic liner and it provides the dispensing pressure. The plastic liner and the elastic sleeve are contained in an outer shell for protection and for providing an outer surface that is usually decorated and printed. The outer shell has a bottom of such shape that the container will stand upright on a flat surface such as a shelf or table.

The container is filled at a factory by pressure flowing an agent thru the valve into and expanding the inner plastic liner and the elastic sleeve. The inner plastic liner is usually pleated to allow for the expansion. Because of the pleating of the inner plastic liner it is necessary that the bottom of the plastic liner have a semi-spherical, ovid or conical shape.

If the inner plastic liner is made of a strong material that has considerable dimensional stability when it is expanded, then the limit of the expansion will be delineated by the dimensions of the expanded plastic liner and the inner surface of the outer shell may not be touched in which case a conventionally designed outer shell having a flat or slightly recessed bottom as shown on the previously mentioned Venus Patent will be satisfactory and the outer shell as described in this invention will not be needed. However, strong plastic materials are usually expensive and also may not have the best barrier properties to be suitable for use in dispensing some kinds of agents It may be desirable because of cost or other considerations to construct the inner plastic liner of weak materials such as polyethylene or other soft plastics in which case the expansion of the plastic liner when it is being filled must be limited by the inner surface of the outer shell rather than by the strength of the plastic liner, especially if excessive pressure is used in the filling process.

Most soft plastic materials have limited stretch or elongation properties and if pleated, a plastic liner would have to expand to fill the corners of a flat bottom outer shell, the materials in the plastic liner would either be ruptured or excessively thinned. It therefore becomes imperative that the bottom of the outer shell be shaped so as to minimize the amount of stretch or elongation of the plastic liner. This invention accomplishes that purpose.

An outer shell can be devised, that is made of two or more pieces to accomplish the purposes defined here, but it is quite evident that forming the bottom of the outer shell integrally as shown and described in the specification is the less costly process and will perhaps produce the higher quality product.

DESCRIPTION OF THE PREFERRED EMBODIMENT

Figure 1:
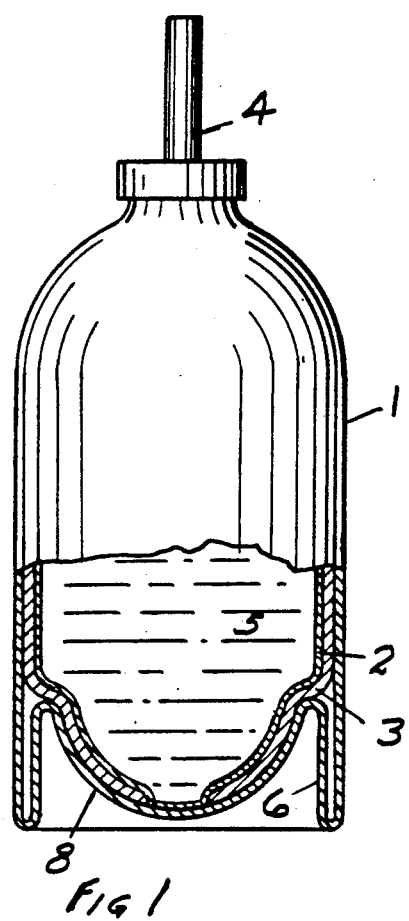
FIG. 1 is an illustration, partially in section of a container of the type herein described, and shown as if it has been filled ready for pressurized dispensing.

Refer to FIG. 1—1 is an outer shell of a container; 2 is an inner liner that contains an agent that is to be dispensed; 3 is an elastic sleeve that provides the pressure for dispensing the agent; 4 is a valve that is attached to the inner liner 2 and is used in the conventional manner to control the dispensing of the agent; 5 is an agent that has been introduced into the container thru the valve by pressure means to expand the inner liner 2 to a size that is limited by the inner dimensions of the outer shell 1. The bottom of the outer shell 1 is recessed at 6 by telescoping part of the reduced cylindrical diameter of the outer shell 1. The bottom construction shown in the FIG. 1 illustrates the essence of this invention.

Figure 2:
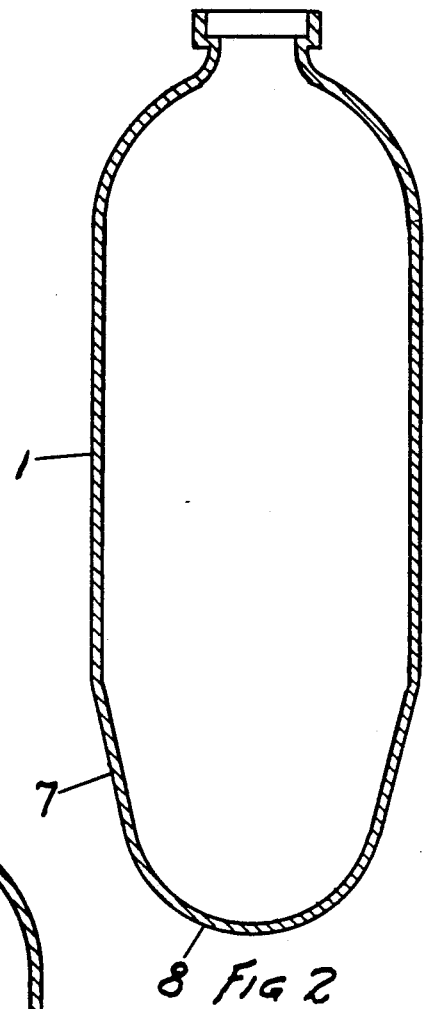
FIG. 2 is an illustration in section of a container outer shell as it comes from a blow molding machine.
Figure 3:
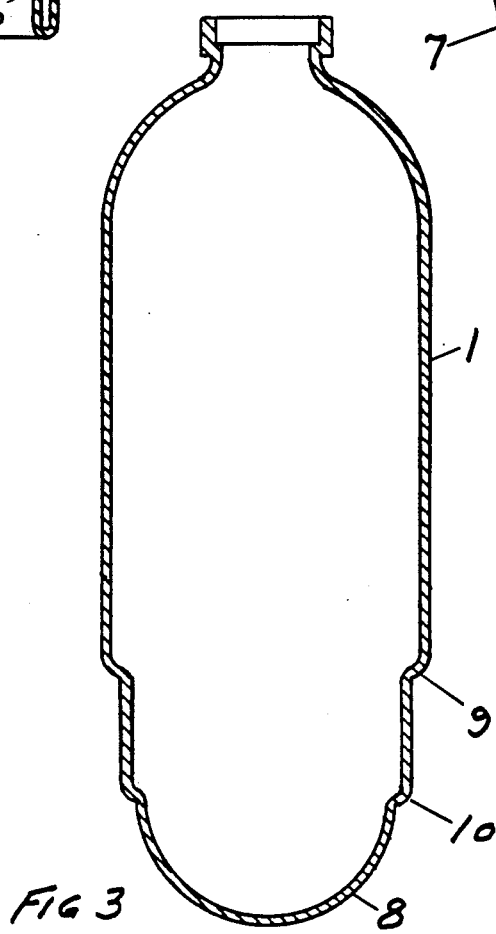
FIG. 3 is an illustration of another design of a blow molded outer shell as it comes from a blow molding machine.

Refer to FIG. 2—This shows in section a blow molded outer shell 1 as it comes from a blow molding machine. It has a tapered reduced diameter at 7 and a semi-spherical end 8 at the bottom. FIG. 3 shows in section an alternate design of an outer shell 1 in which the diameter is reduced in steps at 9 and 10. Either of these designs shown in FIGS. 2 and 3 or a combination of the two designs may be suitable to produce the outer shell 1 shown in FIG. 1.

THE METHOD OF PRODUCING THE SHELL 1

Refer to FIG. 4—11 and 12 are housings of a machine that is used to telescope and form the bottom of the outer shell 1; 13 is a hole into which a blow molded shell is loaded. Portions of housings 11 and 12 are water cooled by circulating cooling water in cavities 14. A radiant heating element 15 is provided that is contained in a refractory ring 16 and supported by housings 11 and 12. A movable plunger die 17 is provided for telescoping the bottom of the outer shell 1. A discharge rod 18 and a stop pawl 19 are also shown. The mechanism for causing the movements of the various parts are not shown as anyone skilled in the art can devise such means.

Figure 4:
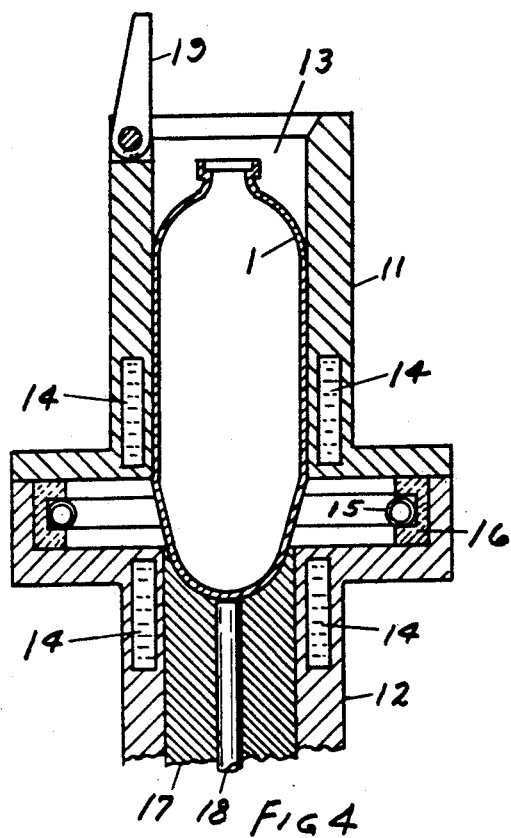
FIG. 4 is a sectional view at a reduced scale that illustrates a blow molded outer shell of the type shown in FIG. 2 when it is loaded into a machine that will re-form its bottom shape.
Figure 5:
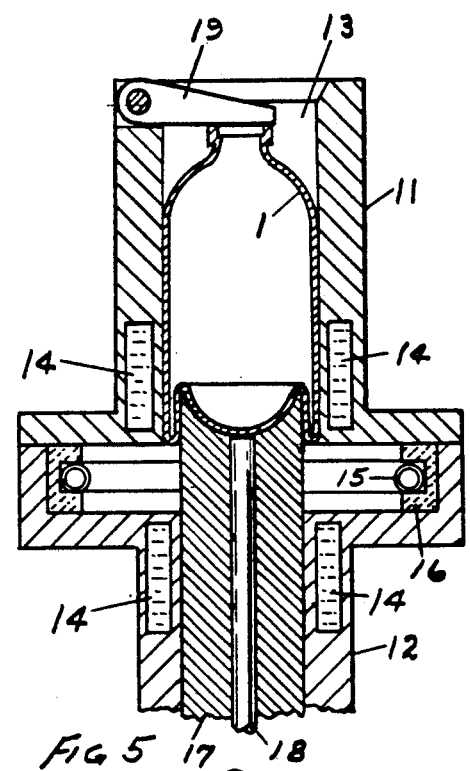
FIG. 5 is a sectional view that illustrates the method of advancing a plunger die to re-form the bottom of an outer shell of the types shown in either FIGS. 2 or 3 after portions of the outer shell have been heated.
Figure 6:
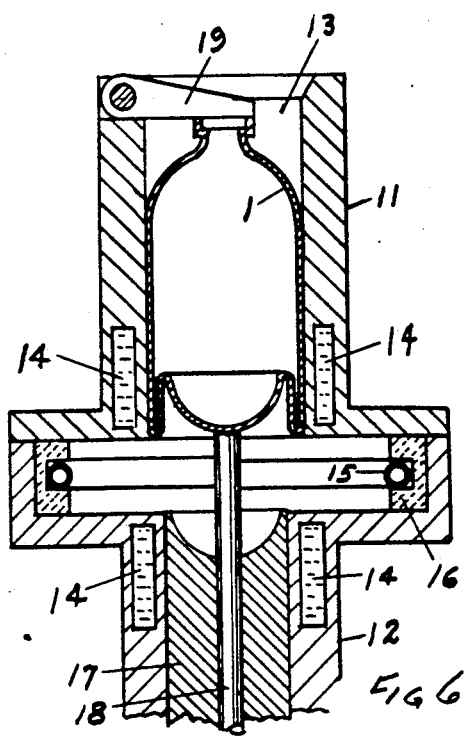
FIG. 6 is a sectional view that illustrates the method of holding the outer shell in place after the re-forming operation while the plunger die is being retracted.
Figure 7:
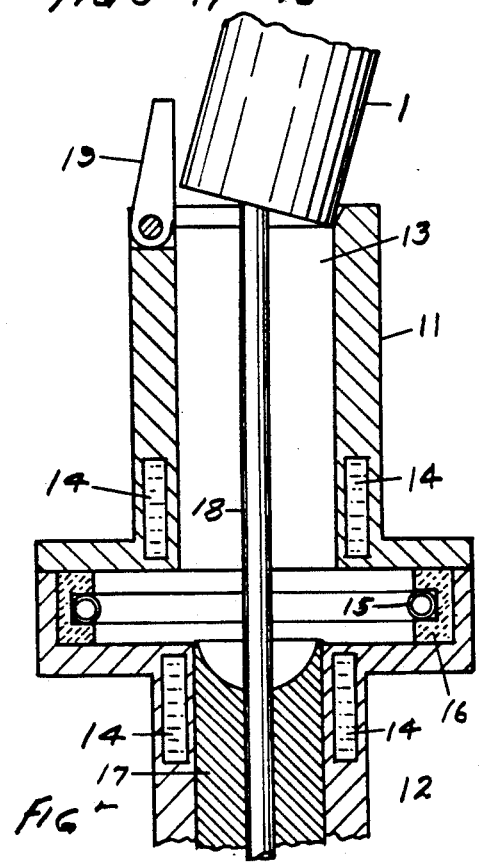
FIG. 7 is a sectional view that illustrates the discharge of the finished outer shell from the re-forming machine.

In the operation of the machine a blow molded outer shell 1 is loaded into the hole 13 as shown in FIG. 4. That portion of outer shell 1 that is exposed to the radiant heat from the heater ring 15 is softened. The stop pawl 19 is rotated and the plunger die 17 is advanced to the positions shown in FIG. 5. This telescopes the bottom of outer shell 1. Plunger die 17 is then retracted, see FIG. 6. The outer shell 1 is retained from following the plunger die 17 by discharge rod 18. The stop panel 19 is then rotated and the discharge rod 18 is advanced to discharged the completed outer shell as shown in FIG. 7.

I claim:

1. A self-pressurized dispensing container comprising:
   an essentially nonelastic inner plastic liner capable of receiving and containing an agent introduced under pressure, said liner having sufficient dimension to contain a volume of said agent,
   a valve operatively attached to said inner liner for controllably dispensing said agent from the container,
   an elastic sleeve surrounding said inner liner, said sleeve provides dispensing pressure to said agent,
   an outer shell formed from a previously molded shell, for containing said elastic sleeve and said inner plastic liner and having sufficient strength to resist said filling pressure of said agent, said outer shell having a top, a bottom and an outer wall, said bottom further comprising a convex center and a periphery, said periphery being telescoped inward such that said center is recessed to define a bottom rim formed from said outer wall and surrounding said center, a semi-spherical interior base surface to minimize said inner liner from elongation or stretching when said inner liner is expanded, said inwardly telescoped periphery of said outer shell bottom is essentially parallel and in close proximity to the outer wall of said outer shell so as to define an essentially void free continuum around said elastic sleeve and said inner plastic liner.

2. The self-pressurized dispensing container as recited in claim 1 wherein said outer shell is reformed from an outer shell having a semi-spherical bottom shape.

3. The self-pressurized dispensing container as recited in claim 1 wherein said outer shell is reformed from an outer shell having an ovid bottom shape.

4. The self-pressurized dispensing container as recited in claim 1 wherein said outer shell is reformed from an outer shell having a conical bottom shape.

5. The self-pressurized dispensing container as recited in claim 1 wherein the convex center of said outer shell bottom is sufficiently recessed to define a bottom rim which maintains said container in an upright position when placed on a flat surface.

6. The method of producing an outer shell for a self-pressurizing container comprising an essentially nonelastic inner plastic liner, an elastic sleeve, a valve and said outer shell having a top, a bottom and an outer wall, comprising the steps:
   molding an outer shell having a bottom further comprising a convex center and a periphery,
   heating the periphery of said outer shell,
   telescoping said periphery toward the inside of said container, such that said center is recessed to define a bottom rim formed by said outer wall and surrounding said center and a semi-spherical interior base surface to minimize said liner from elongation or stretching when said liner is expanded, said inwardly telescoped periphery of said outer shell bottom being formed essentially parallel and in close promixity to the outer wall of said outer shell so as to define an essentially void free continuum around said elastic sleeve and said inner plastic liner.

7. The method of producing an outer shell as recited in claim 6 further comprising the step of sufficiently recessing said convex center of said outer bottom shell to define a bottom rim which maintains said container in an upright position when placed on a flat surface.

* * * * *